(12) United States Patent
Zhang

(10) Patent No.: US 10,418,848 B2
(45) Date of Patent: Sep. 17, 2019

(54) REDUNDANCY POWER SUPPLY SYSTEM AND POWER-SWITCHING CONTROL THEREOF

(71) Applicant: Alpha Networks Inc., Hsinchu (TW)

(72) Inventor: Wenbin Zhang, Chengdu (CN)

(73) Assignee: ALPHA NETWORKS INC., Hsinchu (TW)

( * ) Notice: Subject to any disclaimer, the term of this patent is extended or adjusted under 35 U.S.C. 154(b) by 435 days.

(21) Appl. No.: 14/994,855

(22) Filed: Jan. 13, 2016

(65) Prior Publication Data

US 2016/0226302 A1    Aug. 4, 2016

(30) Foreign Application Priority Data

Jan. 30, 2015  (CN) .......................... 2015 1 0048307

(51) Int. Cl.
*H02J 9/00* (2006.01)
*H02J 9/06* (2006.01)
*H02J 1/10* (2006.01)

(52) U.S. Cl.
CPC .............. *H02J 9/061* (2013.01); *H02J 1/108* (2013.01)

(58) Field of Classification Search
CPC .................................. H02J 9/061; H02J 1/108
USPC ........................................................... 307/64
See application file for complete search history.

(56) References Cited

U.S. PATENT DOCUMENTS

| | | | | | |
|---|---|---|---|---|---|
| 4,788,450 | A | * | 11/1988 | Wagner .................. | H02J 9/061 307/64 |
| 5,243,269 | A | * | 9/1993 | Katayama ................ | H02J 1/10 307/66 |
| 5,811,895 | A | * | 9/1998 | Suzuki .................... | H02J 9/061 307/116 |
| 6,983,383 | B1 | * | 1/2006 | Saito ........................ | G06F 1/30 713/300 |

(Continued)

FOREIGN PATENT DOCUMENTS

| | | |
|---|---|---|
| CN | 203554020 | 4/2014 |
| CN | 103872755 | 6/2014 |

(Continued)

OTHER PUBLICATIONS

State Intellectual Property Office of the People's Republic of China, "Office Action", dated Nov. 29, 2017.
Taiwan Patent Office Search Report dated Mar. 1, 2016.

*Primary Examiner* — Richard Tan
(74) *Attorney, Agent, or Firm* — WPAT, PC

(57) ABSTRACT

For efficient redundancy power supplying, a voltage drop device, a power selection device, a voltage detection device and a switch are provided in a power control circuit of a redundancy power supply system. The voltage drop device performs a voltage drop operation to convert a redundancy operating voltage into a standby voltage. The power selection device receives the main operating voltage and the standby voltage, and selectively outputting one of the main operating voltage and the standby voltage, which is of a higher level. The voltage detection device outputs a control signal according to a comparison result of the main operating voltage and a threshold. The switch is selectively conducted or interrupted according to the control signal. A voltage drop of power passing through the conducted switch (Continued)

is less than a voltage drop of power passing through the voltage drop device.

5 Claims, 3 Drawing Sheets

(56) References Cited

U.S. PATENT DOCUMENTS

| | | | |
|---|---|---|---|
| 7,894,954 B2* | 2/2011 | Cheng | G06F 1/3203 307/64 |
| 8,018,091 B2 | 9/2011 | Liu et al. | |
| 8,189,305 B2* | 5/2012 | Newman | B60R 16/033 361/18 |
| 2007/0269692 A1 | 11/2007 | Chen et al. | |
| 2007/0273216 A1* | 11/2007 | Farbarik | H02J 1/10 307/86 |
| 2013/0043727 A1 | 2/2013 | Liu et al. | |
| 2014/0277802 A1 | 9/2014 | Tomas et al. | |

FOREIGN PATENT DOCUMENTS

| | | |
|---|---|---|
| JP | 10336912 | 12/1998 |
| TW | 200910729 | 3/2009 |
| TW | 201023479 | 6/2010 |
| TW | M384459 | 7/2010 |
| TW | I385896 | 2/2013 |
| TW | 201401719 | 1/2014 |
| TW | 201415764 | 4/2014 |

* cited by examiner

REDUNDANCY POWER SUPPLY SYSTEM AND POWER-SWITCHING CONTROL THEREOF

FIELD OF THE INVENTION

The present invention relates to a power supply system, and more particular to a power supply system capable of executing redundancy power supplying. The present invention further relates to a power control circuit, and more particularly to a power control circuit for executing power-switching control between a main power supply system and a redundancy power supply system.

BACKGROUND OF THE INVENTION

Redundancy power supplying is common means for protecting a working machine from possible damages caused by unstable power while allowing the machine to keep on working. When main power supplying is suspended, redundancy power supplying can take over the main power supplying immediately in order not to interrupt power supplying. With the redundancy power supplying, buffering time enough for a working machine or an operational process to react properly can be acquired. Damages due to power interruption can thus be avoided.

Currently available power supply systems have some drawbacks. For example, since an Oring diode is generally used in an output stage of a redundancy power supply, the main power supply cannot take the priority to supply power when the voltage of the redundancy power supply is higher or equal to that of the main power supply. Even though the main power supply in some power supply system is allowed to supply power as a priority, the power supply system still suffer from either low efficiency or large power voltage fluctuation while switching between the main power supply and the redundancy power supply. Moreover, the control mechanisms of the prior art systems are complicated and thus might slow down the response rate of the power supply system. The redundancy power supplying performance is unsatisfactory.

SUMMARY OF THE INVENTION

Therefore, the present invention provides a redundancy power supply system for use with a main power supplying system, and the power switching between the main power supplying and the redundancy power supplying is smooth and readily.

The present invention further provides a power control circuit used in a redundancy power supply system for switching power between a main power supplying and the redundancy power supplying in a smooth and readily manner.

An aspect of the present invention relates to a power control circuit, which comprises: a main power input terminal for receiving therethrough a first operating voltage; a redundancy power input terminal for receiving therethrough a second operating voltage; a voltage drop device having an input terminal and an output terminal, the input terminal being electrically coupled to the redundancy power input terminal for receiving the second operating voltage therethrough, the voltage drop device performing a voltage drop operation to convert the second operating voltage into a standby voltage, and the output terminal outputting the standby voltage therethrough; a power selection device electrically coupled to the main power input terminal and the output terminal of the voltage drop device for receiving the first operating voltage and the standby voltage, and selectively outputting one of the first operating voltage and the standby voltage, which is of a higher level; a voltage detection device electrically coupled to the main power input terminal for receiving the first operating voltage, and outputting a control signal according to a comparison result of the first operating voltage and a threshold; and a switch electrically coupled among the redundancy power input terminal, the output terminal of the voltage drop device and the voltage detection device, and selectively conducted or interrupted according to the control signal, wherein a voltage drop of power passing through the conducted switch is less than a voltage drop of power passing through the voltage drop device.

Another aspect of the present invention relates to a redundancy power supply system, which comprises: a redundancy power supply; a system power supply terminal; and a power control circuit. The power control circuit comprises: a main power input terminal for receiving therethrough a first operating voltage; a redundancy power input terminal for receiving therethrough a second operating voltage from the redundancy power supply; a voltage drop device having an input terminal and an output terminal, the input terminal being electrically coupled to the redundancy power input terminal for receiving the second operating voltage therethrough, the voltage drop device performing a voltage drop operation to convert the second operating voltage into a standby voltage, and the output terminal outputting the standby voltage therethrough; a power selection device electrically coupled to the main power input terminal and the output terminal of the voltage drop device for receiving the first operating voltage and the standby voltage, and selecting one of the first operating voltage and the standby voltage, which is of a higher level, to be outputted through the system power supply terminal; a voltage detection device electrically coupled to the main power input terminal for receiving the first operating voltage, and outputting a control signal according to a comparison result of the first operating voltage and a threshold; and a switch electrically coupled among the redundancy power input terminal, the output terminal of the voltage drop device and the voltage detection device, and selectively conducted or interrupted according to the control signal, wherein a voltage drop of power passing through the conducted switch is less than a voltage drop of power passing through the voltage drop device.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
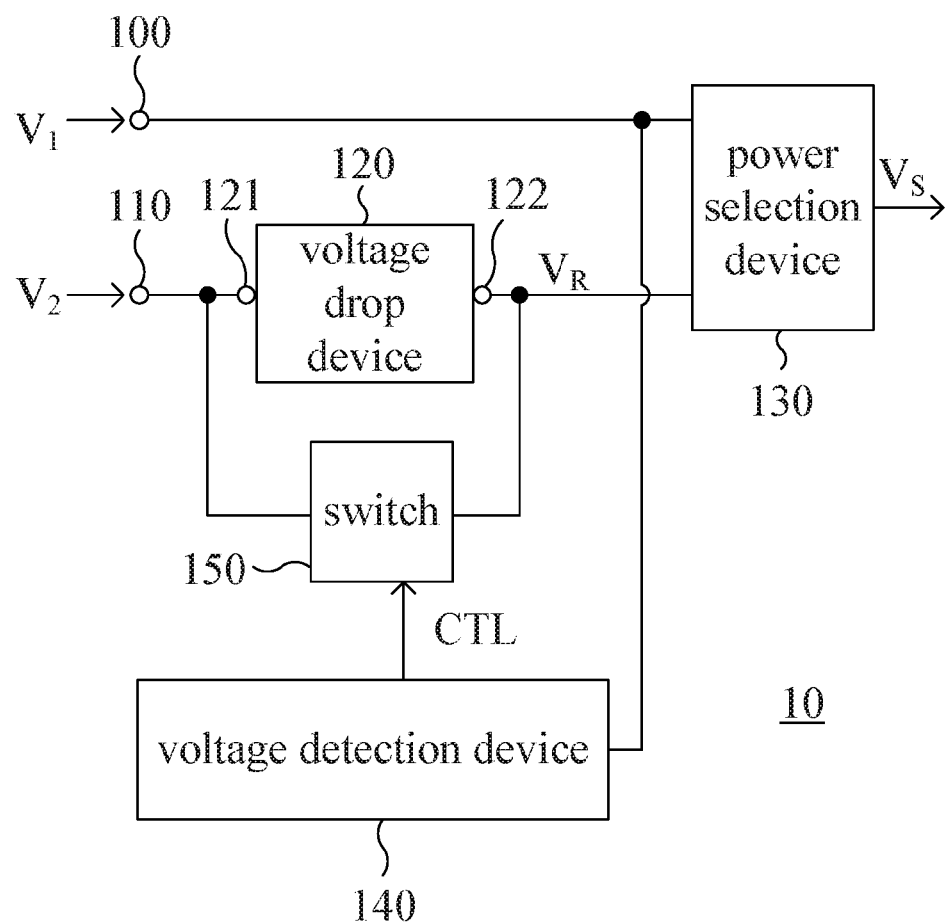
FIG. 1 is a circuit block diagram schematically illustrating a power control circuit according to an embodiment of the present invention.

Please refer to FIG. 1. An embodiment of a redundancy power control circuit 10 according to the present invention includes a main power input terminal 100, a redundancy power input terminal 110, a voltage drop device 120, a power selection device 130, a voltage detection device 140 and a switch 150. Through the main power input terminal 100, an operating voltage $V_1$ is received, and through the redundancy power input terminal 110, another operating voltage $V_2$ is received. The drop voltage device 120 has an input terminal 121 electrically coupled to the redundancy power input terminal 110 for receiving the operating voltage $V_2$, and an output terminal 122. The drop voltage device 120 performs a voltage drop operation on the operating voltage $V_2$ to obtain and output a standby voltage $V_R$ through the output terminal 122. The power selection device 130 is electrically coupled to the main power input terminal 100 and the output terminal 122 of the drop voltage device 120 for receiving the operating voltage $V_1$ and the standby voltage $V_R$, and selecting one of the operating voltage $V_1$ and the standby voltage $V_R$, which is higher, as an output of the power selection device 130. The voltage detection device 140 is electrically coupled to the main power input terminal 100 for receiving the operating voltage $V_1$, and outputs a control signal CTL according to a comparison result between the operating voltage $V_1$ and a threshold. The switch 150 is electrically coupled between the redundancy power input terminal 110 and the output terminal 122 of the drop voltage device 120, and controlled to be switched on or off according to the control signal CTL. In the present design, a voltage drop of the power passing through the switch 150 occurs when the switch 150 is in an ON state, i.e. a conducting state, should be less than a voltage drop of the power passing through the voltage drop device 120.

The above-mentioned threshold needed by the voltage detection device 140 may be a preset value. Alternatively, it may be a variable changing with an external condition. It is to be noted that the acquisition way of the threshold have little or no effect on the substance of the present invention.

Figure 2:
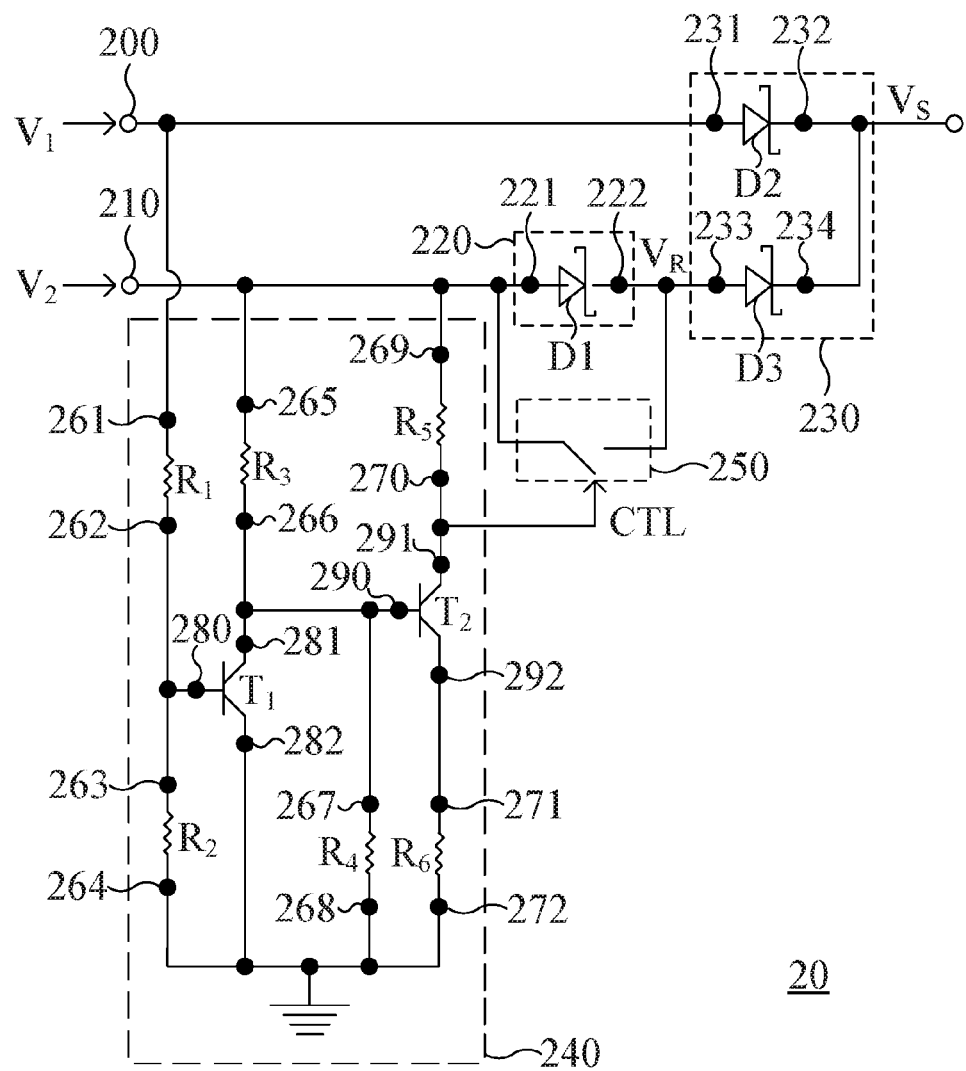
FIG. 2 is a circuit diagram schematically illustrating an example of the power control circuit as shown in FIG. 1.

Please refer to FIG. 2, in which an exemplified power control circuit feasible for implementing the redundancy power supply system of FIG. 1 is illustrated. The redundancy power supply system includes a main power input terminal 200, a redundancy power input terminal 210, a voltage drop device 220, a power selection device 230, a voltage detection device 240 and a switch 250 as shown. In this example, the voltage detection device 240 is electrically coupled to the main power input terminal 200 for receiving the operating voltage $V_1$, and further electrically coupled to the redundancy power input terminal 210 for receiving the operating voltage $V_2$. Hereinafter, the circuitry of the power control circuit will be described in more detail.

In the power control circuit of FIG. 2, the operating voltage $V_1$ and the operating voltage $V_2$ are received through the main power input terminal 200 and the redundancy power input terminal 210, respectively. The voltage drop device 220 is, for example, implemented with a diode D1 having an anode 221 electrically coupled to the redundancy power input terminal 210 for receiving the operating voltage $V_2$, and having a cathode 222 at the same level as the standby voltage $V_R$ as described with reference to FIG. 1. The power selection device 230 includes two diodes D2 and D3, wherein an anode 231 of the diode D2 is electrically coupled to the main power input terminal 200 for receiving the operating voltage $V_1$, and an anode 233 of the diode D3 is electrically coupled to a cathode 222 of the diode D1, which is equivalent to the output terminal 122 of the voltage drop device 120 for receiving a voltage of the cathode 222 of the diode D1. The diodes D2 and D3 are electrically coupled to each other with respective cathodes 232 and 234. Accordingly, the voltage drops caused by the diodes D2 and D3 themselves would be identical, and if a voltage at the anode 231 of the diode D2 is higher than a voltage at the anode 233 of the diode D3, the power selection device 230 will select the voltage at the cathode 232 of the diode D2 to be the system voltage $V_s$. In contrast, if the voltage at the anode 231 of the diode D2 is lower than the voltage at the anode 233 of the diode D3, the power selection device 230 will select the voltage at the cathode 234 of the diode D3 to be the system voltage $V_s$. As a result, the power selection device 230 may properly select one of the operating voltage $V_1$ and the standby voltage $V_R$ to be outputted as the system voltage $V_s$.

It is to be noted that the use of diodes in the power control circuit as the voltage drop device 220 and the power selection device 230 is for illustration purpose only, and any other suitable one-way current flow element or even other electronic elements or means capable of achieving the objectives of voltage drop and power selection. For example, a simple resistor device or an impedance inherently existing in the circuit can be used to achieve an objective of making a voltage drop of the operating voltage $V_2$ passing through the voltage drop device 220 to reach the power selection device 230 is larger than a voltage drop of the operating voltage $V_1$ reaching the power selection device 230. Likewise, the power selection device 230 itself may be implemented with a simple resistor device or an impedance inherently existing in the circuit.

Referring to FIG. 2 again, the voltage detection device 240 includes resistors $R_1$, $R_2$, $R_3$, $R_4$, $R_5$ and $R_6$, and transistors $T_1$ and $T_2$, wherein terminal 261 of the resistor $R_1$ is electrically coupled to the main power input terminal 200, and a terminal 262 of the resistor $R_1$, a terminal 263 of the resistor $R_2$ and a control end 280 of the transistor $T_1$ are electrically coupled to one another. A terminal 265 of the resistor $R_3$ and a terminal 269 of the resistor $R_5$ are both electrically coupled to the redundancy power input terminal 210. A terminal 266 of the resistor $R_3$, a terminal 267 of the resistor $R_4$, a channel end 281 of the transistor $T_1$ and a control end 290 of the transistor $T_2$ are electrically coupled to one another. A terminal 270 of the resistor $R_5$ is electrically coupled to a channel end 291 of the transistor $T_2$. A channel end 292 of the transistor $T_2$ is electrically coupled to a terminal 271 of the resistor $R_6$. A terminal 264 of the resistor $R_2$, a terminal 268 of the resistor $R_4$, a terminal 272 of the resistor $R_6$, and a channel end 282 of the transistor $T_1$ are all grounded According to the configuration of the voltage detection device 240, the operating voltage $V_1$ is divided by the resistors $R_1$ and $R_2$, and the divided voltage can affect the conductivity degree of the transistor $T_1$ via the control end 280 of the transistor $T_1$, and affect the voltage at the control end 290 of transistor $T_2$ together with the operating voltage $V_2$ and the resistances of the resistors $R_3$ and $R_4$. Furthermore, the conductivity degree of the transistor $T_2$, the operating voltage $V_2$ and the resistance of the resistors $R_5$ and $R_6$ will affect the contents of the control signal CTL containing a voltage value at the terminal 270 of the resistor $R_5$.

In a specific example, the resistance of each of the resistors $R_1$ and $R_4$ is 10000 ohms, the resistance of each of the resistors $R_2$ and $R_3$ is 1000 ohms, the resistance of the resistor $R_5$ is 1800 ohm, and the resistance of the resistor $R_6$ is 3600 ohm. The above values are given as an example only, and may be adjusted depending on practical requirements of the circuitry.

Referring to the embodiment of the power control circuit as shown in FIG. 2, the contents of the control signal CTL vary with the operating voltage $V_1$, the operating voltage $V_2$ and the specification of the electronic elements included in the voltage detection device 240. In other words, the threshold value needed for the comparing operation with the operating voltage $V_1$ in the voltage detection device 240 varies with the operating voltage $V_2$ and the specification of the electronic elements included in the voltage detection device 240. If the operating voltage $V_2$ and the specification of the electronic elements included in the voltage detection device 240 are kept constant, the threshold value needed for the comparing operation with the operating voltage $V_1$ would also be constant. When the operating voltage $V_1$ is lower than the threshold, the switch 250 is in an ON state, i.e. conducted, according to the control signal CTL, while the switch 250 will be turned off, or interrupted, in response to the control signal CTL once the operating voltage $V_1$ becomes higher than the threshold, and vice versa.

The switch 250 as shown in FIG. 2 is implanted with an ON/OFF switch. Two ends of the switch 250 are electrically coupled to the redundancy power input terminal 210, the cathode 222 of the diode D1 and the anode 233 of the diode D3. Any other type of switch may alternatively be used as the switch 250 as long as a voltage drop caused while the power is passing through the conductive switch is smaller than a voltage drop caused while the power is passing the voltage drop device 220.

It is understood from the above descriptions that in Stage 1 when the operating voltage $V_1$ is equal to or slightly less than the operating voltage $V_2$, the operating voltage $V_1$ can still be used as the power source of the system voltage $V_s$ since the voltage drop circuitry can make the standby voltage $V_R$ lower than the operating voltage $V_1$. In Stage 2 when the operating voltage $V_1$ is descending to a level lower than the standby voltage $V_R$, the power selection device will select the standby voltage $V_R$ as power source of the system voltage $V_S$. In subsequent Stage 3 when the operating voltage $V_1$ becomes lower than the threshold, the switch 250 will be conducted in response to the control signal CTL so that the standby voltage $V_R$ will be raised due to the operating voltage $V_2$ passing the switch 250. Meanwhile, the power selection device will select the raised standby voltage $V_R$ as power source of the system voltage $V_S$. In contrast, when the operating voltage $V_1$ restores, the power source of the system voltage $V_S$ will be readily changed back to the operating voltage $V_1$.

By controlling the resistance combinations of the associated resistors, it is feasible to make the operating voltage $V_1$, which has descent down to the threshold value, still higher than the standby voltage $V_R$ but slightly lower than the operating voltage $V_2$. Since the switch 250 has been conducted at this time, the power selection device may directly adopt the raised standby voltage $V_R$ as power source of the system voltage $V_S$. In other words, the operational stage of the power control circuit is switched from Stage 1 directly to Stage 3 without executing Stage 2.

Figure 3:
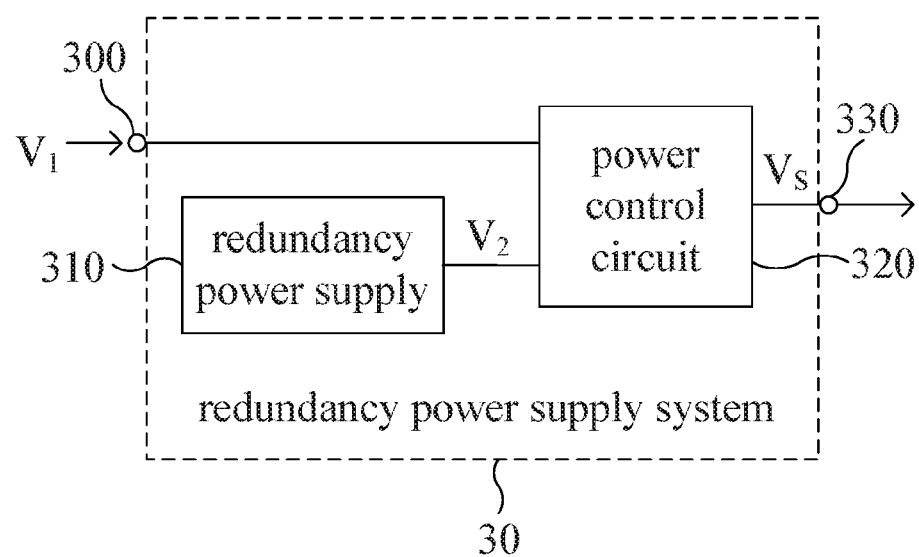
FIG. 3 is a circuit block diagram schematically illustrating a redundancy power supply system according to an embodiment of the present invention.

Hereinafter, please refer to FIG. 3, in which an embodiment of a redundancy power supply system including a power control circuit according to an embodiment of the present invention, e.g. any of the exemplified power control circuit as described above, is illustrated. The redundancy power supply system 30 includes a main power input terminal 300, a redundancy power supply 310, a power control circuit 320 and a system power supply terminal 330. The main power input terminal 300 receives an operating voltage $V_1$ from the external and transmits the operating voltage $V_1$ to the power control circuit 320. The redundancy power supply 310 provides the operating voltage $V_2$ to the power control circuit 320. The system power supply terminal 330 is electrically coupled to the power control circuit 320 for outputting the system voltage $V_S$ provided by the power control circuit 320 outwards. The power control circuit 320 may alternatively be implemented with any other suitable circuit modified from or originated from the circuit shown in FIG. 1 or 2.

To sum up, the voltage detection device determines the contents of the control signal to be outputted thereby according to a comparison result of the main power voltage and the threshold value. The control signal is then used for controlling the conductive state of the switch in order to determine the redundancy power level to be provided to the power selection device. As a result, the switching between the main power supply and the redundancy power supply can be executed readily. In addition, the use of the voltage drop device allows the main power supply to take charge of power supplying even if the voltage of the main power supply is equal to or slightly less than the voltage of the redundancy power supply.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures. For example, in spite hardware devices are exemplified as above in order to practice the redundancy power supply system and the power control circuit according to the present invention, hardware/software hybrid modules or firmware designs may also adopted as alternatives of the devices when appropriate.

What is claimed is:

1. A power control circuit, comprising:
   a main power input terminal for receiving therethrough a first operating voltage;
   a redundancy power input terminal for receiving therethrough a second operating voltage;
   a voltage drop device having an input terminal and an output terminal, the input terminal being electrically coupled to the redundancy power input terminal for receiving the second operating voltage therethrough, the voltage drop device performing a voltage drop operation to convert the second operating voltage into a standby voltage, and the output terminal outputting the standby voltage therethrough;
   a power selection device comprising a first diode, an anode of which is electrically coupled to the main power input terminal, and a second diode, an anode of which is electrically coupled to the output terminal of the voltage drop device, and cathodes of the first diode and the second diode being electrically coupled to each other as an output end of the power selection device, wherein the first operating voltage and the standby voltage are coupled to the first diode and the second diode, respectively, and which one of the first operating voltage and the standby voltage will be outputted from the output end of the power selection device is inherently determined according to levels of the first operating voltage, the second operating voltage and the standby voltage;
a voltage detection device electrically coupled to the main power input terminal for receiving the first operating voltage, and outputting a control signal according to a comparison result of the first operating voltage and a threshold; and
a switch electrically coupled among the redundancy power input terminal, the output terminal of the voltage drop device and the voltage detection device, and selectively conducted or interrupted according to the control signal, wherein a voltage drop of power passing through the conducted switch is less than a voltage drop of power passing through the voltage drop device,
wherein the voltage detection device is further electrically coupled to the redundancy power input terminal, and comprises:
a first resistor having a first terminal and a second terminal, the first terminal of the first resistor being electrically coupled to the main power input terminal;
a second resistor having a first terminal and a second terminal, the first terminal of the second resistor being electrically coupled to the second terminal of the first resistor, and the second terminal of the second resistor being grounded;
a third resistor having a first terminal and a second terminal, the first terminal of the third resistor being electrically coupled to the redundancy power input terminal;
a fourth resistor having a first terminal and a second terminal, the first terminal of the fourth resistor being electrically coupled to the second terminal of the third resistor, and the second terminal of the fourth resistor being grounded;
a fifth resistor having a first terminal and a second terminal, the first terminal of the fifth resistor being electrically coupled to the redundancy power input terminal, and the control signal being provided to the switch through the second terminal of the fifth resistor;
a first transistor having a control end, a first channel end and a second channel end, the control end of the first transistor being electrically coupled to the second terminal of the first resistor, the first channel end of the first transistor being electrically coupled to the second end of the third resistor, and the second channel end of the first transistor being grounded;
a second transistor having a control end, a first channel end and a second channel end, the control end of the second transistor being electrically coupled to the second terminal of the third resistor, and the first channel end of the second transistor being electrically coupled to the second end of the fifth resistor; and
a sixth resistor having a first terminal and a second terminal, the first terminal of the sixth resistor being electrically coupled to the second channel end of the second transistor, and the second terminal of the sixth resistor being grounded.

2. The power control circuit according to claim 1, wherein the voltage drop device comprises:
a diode having an anode serving as the input terminal of the voltage drop device, and a cathode serving as the output terminal of the voltage drop device.

3. A redundancy power supply system, comprising:
a redundancy power supply;
a system power supply terminal; and
a power control circuit, comprising:
a main power input terminal for receiving therethrough a first operating voltage;
a redundancy power input terminal for receiving therethrough a second operating voltage from the redundancy power supply;
a voltage drop device having an input terminal and an output terminal, the input terminal being electrically coupled to the redundancy power input terminal for receiving the second operating voltage therethrough, the voltage drop device performing a voltage drop operation to convert the second operating voltage into a standby voltage, and the output terminal outputting the standby voltage therethrough;
a power selection device electrically coupled to the main power input terminal and the output terminal of the voltage drop device, and comprising a first one-way current flow element and a second one-way current flow element coupled to the first operating voltage and the standby voltage, respectively, and selecting one of the first operating voltage and the standby voltage, which is of a higher level, to be outputted through the system power supply terminal as a system voltage;
a voltage detection device electrically coupled to the main power input terminal for receiving the first operating voltage, and outputting a control signal according to a comparison result of the first operating voltage and a threshold; and
a switch electrically coupled among the redundancy power input terminal, the output terminal of the voltage drop device and the voltage detection device, and selectively conducted or interrupted according to the control signal, wherein a voltage drop of power passing through the conducted switch is less than a voltage drop of power passing through the voltage drop device,
wherein the voltage detection device is further electrically coupled to the redundancy power input terminal, and comprises:
a first resistor having a first terminal and a second terminal, the first terminal of the first resistor being electrically coupled to the main power input terminal;
a second resistor having a first terminal and a second terminal, the first terminal of the second resistor being electrically coupled to the second terminal of the first resistor, and the second terminal of the second resistor being grounded;
a third resistor having a first terminal and a second terminal, the first terminal of the third resistor being electrically coupled to the redundancy power input terminal;
a fourth resistor having a first terminal and a second terminal, the first terminal of the fourth resistor being electrically coupled to the second terminal of the third resistor, and the second terminal of the fourth resistor being grounded;
a fifth resistor having a first terminal and a second terminal, the first terminal of the fifth resistor being electrically coupled to the redundancy power input terminal, and the control signal being provided to the switch through the second terminal of the fifth resistor;
a first transistor having a control end, a first channel end and a second channel end, the control end of the first transistor being electrically coupled to the second terminal of the first resistor, the first channel end of the first transistor being electrically coupled to the second end of the third resistor, and the second channel end of the first transistor being grounded;

a second transistor having a control end, a first channel end and a second channel end, the control end of the second transistor being electrically coupled to the second terminal of the third resistor, and the first channel end of the second transistor being electrically coupled to the second end of the fifth resistor; and a sixth resistor having a first terminal and a second terminal, the first terminal of the sixth resistor being electrically coupled to the second channel end of the second transistor, and the second terminal of the sixth resistor being grounded, and wherein the first one-way current flow element and the second one-way current flow element are further electrically coupled to each other as an output end of the power selection device, so that:

when the first operating voltage is equal to or slightly less than the second operating voltage, the first operating voltage is outputted as the system voltage as the voltage drop circuitry operates to make the standby voltage lower than the first operating voltage;

when the first operating voltage is descending to a level lower than the standby voltage, the standby voltage is outputted as the system voltage; and when the first operating voltage becomes lower than a threshold, the switch is conducted in response to the control signal so that the standby voltage is raised due to the second operating voltage passing the switch while the raised standby voltage is outputted as the system voltage, and when the first operating voltage restores, the first operating voltage is outputted as the system voltage again.

4. The redundancy power supply system according to claim 3, wherein:

the first one-way current flow element is a first diode; and the second one-way current flow element is a second diode, wherein an anode of the first diode is electrically coupled to the main power input terminal, an anode of the second diode is electrically coupled to the output terminal of the voltage drop device, and cathodes of the first diode and the second diode are electrically coupled to each other as the output end of the power selection device.

5. The redundancy power supply system according to claim 3, wherein the voltage drop device comprises:

a diode having an anode serving as the input terminal of the voltage drop device, and a cathode serving as the output terminal of the voltage drop device.

* * * * *